(12) United States Patent
Livesay et al.

(10) Patent No.: US 6,321,138 B1
(45) Date of Patent: Nov. 20, 2001

(54) STORAGE AND RETRIEVAL SYSTEM WITH AUTOMATED ORDER MAKE UP

(75) Inventors: Mark F. Livesay, Palmyra; J. Thomas Woodson, III, Lititz, both of PA (US)

(73) Assignee: Woodson Incorporated, Lititz, PA (US)

( * ) Notice: Subject to any disclaimer, the term of this patent is extended or adjusted under 35 U.S.C. 154(b) by 0 days.

(21) Appl. No.: 09/662,720

(22) Filed: Sep. 15, 2000

(51) Int. Cl.[7] .................................................... G06F 19/00
(52) U.S. Cl. ......................... 700/245; 700/247; 700/249; 700/213; 700/215; 700/222; 700/230; 414/744.3; 414/273; 414/331.04; 198/346.1; 198/465.1; 312/287; 312/295; 901/31; 901/37
(58) Field of Search ................................... 700/245, 218, 700/222, 2, 173, 247, 249, 213, 215, 230; 414/744.3, 273, 231.04, 911; 264/537, 532; 198/778, 346.1, 349, 349.6, 350, 346.2, 465.1, 468.11, 345.3; 312/287, 295; 901/31, 37

(56) References Cited

U.S. PATENT DOCUMENTS

| | | |
|---|---|---|
| 3,700,128 | 10/1972 | Noble et al. . |
| 3,800,963 | 4/1974 | Holland . |
| 3,805,973 | 4/1974 | Thompson . |
| 3,850,317 | 11/1974 | Lumier . |
| 3,905,492 | 9/1975 | Maeda et al. . |
| 3,921,828 | 11/1975 | Suizu . |
| 3,964,619 | 6/1976 | Irmler . |
| 4,338,056 | 7/1982 | Abrahamson et al. . |
| 4,395,181 | 7/1983 | Loomer . |
| 4,549,841 | 10/1985 | Ishige . |
| 4,850,783 | 7/1989 | Maekawa . |
| 4,856,956 | 8/1989 | Zur . |
| 5,199,840 | 4/1993 | Castaldi et al. . |
| 5,222,855 | * 6/1993 | Bernard, II et al. ............ 414/331.03 |
| 5,324,157 | 6/1994 | Stolzer . |
| 5,370,492 | 12/1994 | Gleyze et al. . |

(List continued on next page.)

FOREIGN PATENT DOCUMENTS

| | | |
|---|---|---|
| 405024609 | * 2/1993 | (JP) . |
| 406277882 | * 10/1994 | (JP) . |

OTHER PUBLICATIONS

Ting–Li, Automatic warehouse, 1995, IEEE, pp. 246–249.*

Primary Examiner—William A. Cuchlinski, Jr.
Assistant Examiner—McDieunel Marc
(74) Attorney, Agent, or Firm—James Creighton Wray; Meera P. Narasimhan

(57) ABSTRACT

A basket storage and retrieval apparatus and method has spaced parallel rows of storage racks with multiple horizontal tiers having aisles between the storage racks. Guides are connected to the aisle and a stacker retriever is connected to the guides. The stacker retriever has at least one vertical member. A carriage is mounted on the vertical member for moving up and down the vertical member and for aligning with storage rack tiers on opposite sides of the aisle. Carriers are mounted on the carriage for moving into horizontal tiers and for lowering baskets within the tiers for resting on the tiers and raising baskets from the tiers for moving the raised baskets toward the carriage. A robotic input lane extends through the storage racks. A robotic output lane extends through the storage racks. An input transfer conveyor is connected to the robotic input lane and an output transfer conveyor is connected to the robotic output lane. An input conveyor is connected to the input transfer conveyor for supplying loaded baskets to the robotic input lane. An output conveyor is connected to the output transfer lane for receiving loaded baskets from the robotic output lane. A dolly loader or conveyor loop is connected to the output conveyor for loading dollies or moving basket stacks for loading on trucks. Input and output conveyor lanes are mounted in the racks for transferring loaded baskets between input transfer conveyors, stacker retriever carriers and output transfer conveyors.

19 Claims, 2 Drawing Sheets

U.S. PATENT DOCUMENTS

| | | |
|---|---|---|
| 5,379,229 | 1/1995 | Parsons et al. . |
| 5,407,316 * | 4/1995 | Coatta et al. ........................ 414/787 |
| 5,411,151 | 5/1995 | Sasada . |
| 5,472,309 | 12/1995 | Bernard, II et al. . |
| 5,540,532 | 7/1996 | Carder et al. . |
| 5,564,890 | 10/1996 | Knudsen, Jr. . |
| 5,636,966 | 6/1997 | Kyon et al. . |
| 5,848,867 | 12/1998 | Gagnon et al. . |
| 5,893,697 * | 3/1999 | Zini et al. ............................ 414/273 |
| 6,168,246 * | 1/2001 | Kurihara ........................... 312/139.2 |
| 6,199,722 * | 3/2001 | Ohgi .................................... 221/123 |

* cited by examiner

STORAGE AND RETRIEVAL SYSTEM WITH AUTOMATED ORDER MAKE UP

BACKGROUND OF INVENTION

Large manufacturers, for example bakeries, require long product runs for economies. When one product is switched to another, the entire production system is cleaned and rearranged where necessary, resulting in down time on production. It is useful to make the production runs as long as possible so that the ingredient receiving and loading, the mixing, product forming and shaping, and baking processes remain uniform in long production runs.

To achieve the economies of long production runs in a bakery, it is necessary to provide interim storage for products.

It is particularly beneficial when a bakery is producing several different products that it produce all of each particular product needed for that day during one production run. Often in large bakeries, the production of products occurs twenty-four hours a day. It is also desirable that most of the products leave the bakery within a few hours in the early morning for proper distribution to retailers so that fresh baked goods can be sold. Orders are received in a bakery to produce so many products of each type every day. When adequate interim storage facilities are available the production runs may be long and continuous, with one production run for each product in each day.

Needs exist for storage facilities which reliably and quickly move products from the bakery output and which reliably and quickly move the products from the storage facility to trucks for delivery.

SUMMARY OF THE INVENTION

The present invention provides interim storage for production run surges of individual products among many output products in a bakery, for example, basket storage and retrieval apparatus for a bakery. Spaced parallel rows of storage racks with multiple horizontal tiers are provided with aisles between the storage racks. Guides are connected to the aisle, and a stacker retriever is connected to the guides. The stacker retriever has at least one vertical member. A carriage is mounted on the vertical member for moving up and down the vertical member and for aligning with storage rack tiers on opposite sides of the aisle. At least one carrier is mounted on the carriage for moving into the horizontal tiers and for lowering baskets within the tiers for resting on the tiers and raising baskets from the tiers for moving the raised baskets toward the carriage. At least one robotic input lane extends through the storage racks. At least one robotic output lane extends through the storage racks. Input and output transfer conveyors are on sides of the storage racks opposite the aisle. An input transfer conveyor is connected to the robotic input lane and an output transfer conveyor is connected to the robotic output lane. An input conveyor is connected to the input transfer conveyor for supplying loaded baskets to the robotic input lane. An output conveyor is connected to the output transfer conveyor for receiving loaded baskets from the robotic output lane. A dolly loader or conveyor loop is connected to the output conveyor. The conveyor loop carries loaded baskets and stacks of loaded baskets directly to truck loading stations. The dolly loader loads dollies with baskets or stacks of loaded baskets for loading on trucks.

Preferably, at least one robotic input lane extends through the second storage rack from the aisle to an outer side of the second storage rack. An input transfer conveyor is connected to the second robotic input and is connected to the input conveyor for delivering loaded baskets and stacks of loaded baskets to the second robotic input lane. Preferably, at least one robotic output lane extends through the second storage rack from the aisle to an outer side of the second storage rack. A second robotic output is connected to the second robotic output lane. A second output transfer conveyor is connected between the second robotic output lane and the output conveyor for moving loaded baskets and stacks of loaded baskets from the second robotic output lane to the output conveyor.

The output conveyor preferably consists of a loop for receiving loaded basket stacks from the output transfer conveyors. Trucks may be docked for loading on opposite sides of the interim storage racks. In that case, a second dolly loader or conveyor loop is connected to the output conveyor for receiving loaded baskets or stacks from the output conveyor and moving the loaded basket stacks for insertion in trucks.

Preferably, at least one conveyor input lane and at least one conveyor output lane extend through each of the racks. The input transfer conveyors are connected to the conveyor input lanes and the input conveyor for moving loaded baskets and stacks onto the conveyor input lane. The output transfer conveyors are connected to the conveyor output lanes and to the output conveyor for moving loaded baskets and stacks of loaded baskets from the conveyor output lanes to the output conveyor.

Preferably, an input inspection station inspects the loaded baskets and identification on the loaded baskets before admitting the loaded baskets to the input conveyor. A rejection conveyor is connected to the input inspection station for moving rejected baskets from the input inspection station.

Output tagging and/or reading stations are connected to the robotic output lanes and the conveyor output lanes for tagging and/or reading loaded baskets leaving the output lanes before moving the loaded baskets to the output conveyor.

The stacker retriever preferably has two spaced vertical members. The carriage rides up and down on the vertical members. The carriage holds parallel carriers capable of moving to either side for entering the racks and depositing baskets and stacks deeply within the racks and retrieving baskets and stacks from deeply within the racks.

One preferred apparatus for temporarily storing surges of the product and retrieving the product has an input conveyor which is connected to a source of the product-loaded baskets. An identification station is connected to the input conveyor for checking identification of the loaded baskets. A rejection conveyor is connected to the identification station for removing loaded baskets with no or improper identification. A storage rack having multiple rows of storage is arranged in multiple tiers which provide multiple storage locations roughly equivalent to a number of tiers times a number of rows times the number of basket stacks. Each of the storage locations has an elongation capable of receiving and storing multiple loaded baskets. An aisle is adjacent to the storage racks, and the storage locations open into the aisle for access from the aisle. A stacker retriever is mounted in the aisle and has two vertical members for moving horizontally along the aisle in front of the openings of the storage locations. A carriage is movable up and down the vertical members for aligning with the storage locations. Carriers mounted on the carriage move from the carriage into the storage locations for depositing loaded baskets and stacks into the storage locations and for retrieving loaded baskets and stacks from the storage locations. A robotic lane is connected to the rack. An input transfer conveyor is connected between the input conveyor and the robotic input lane. A tag station is connected to the output transfer conveyor. An output transfer conveyor is connected between the output conveyor and the robotic output lane. An output tag station is connected between to the output conveyor and the robotic output lane for tagging and/or reading loaded baskets moving onto output transfer conveyor. A loading output is connected to the output conveyor for loading the loaded baskets for movement away from the storage apparatus.

A second rack is spaced from the first rack. It is positioned adjacent to the aisle with second storage locations opening into the aisle for receiving the carriers with loaded baskets and stacks of loaded baskets in the second storage locations. Second robotic lanes are connected to the second rack for transferring stacks of loaded baskets into and out of the racks. A second input transfer conveyor is connected to the input conveyor and to the second robotic input lanes for transferring loaded baskets from the input conveyor to the second robotic lanes. A second output transfer conveyor is connected to second robotic output lane and to the output conveyor for transferring stacks of loaded baskets from the robotic lane to the output conveyor.

The robotic lanes include first robotic input lanes and first robotic output lanes in the first storage rack. Second robotic input lanes and second robotic output lanes are in the second storage rack. A second output tag station is connected to the second output transfer conveyor for tagging and/or reading destination of the loaded baskets.

Dolly loaders or conveyor loops are connected to the output conveyor for receiving loaded baskets and stacks and moving loaded baskets and stacks away from the output conveyor. A transfer conveyor is connected between the input conveyor and the output conveyor for transferring loaded basket stacks directly from the input conveyor to the output conveyor by passing the interim storage racks.

In a preferred embodiment, switches are connected between the input conveyor and the reject conveyor, the input conveyor and the bypass transfer conveyor, and the input conveyor and the transfer conveyors for selectively switching loaded baskets and stacks of loaded baskets according to identifications on the loaded baskets. Switches are connected to the first and second loaders or conveyor loops. Readers are connected to the switches for operating the switches.

A preferred method of storing and retrieving production run product surges consists of loading baskets with products. The baskets are identified according to the product within the baskets. The baskets are checked for identification, and baskets without identification are rejected. Identified baskets are moved on input conveyor. From the input conveyor, the baskets are moved to input transfer conveyors. The baskets on the input transfer conveyors are moved to robotic input lanes and to conveyor input lanes. The baskets on input lanes are conveyed to carriers on a stacker retriever carriage or moved by robots to staging location or robotic lane. The carriage is moved to an open storage location. The basket identification and the storage location are recorded. The baskets are loaded with the other products. The other baskets are identified according to the other products. The identified baskets are moved with the other products on an input conveyor. The loaded baskets are moved with the other products on the input transfer conveyors to the conveyor input lanes. The baskets are moved with the other products from the conveyor input lanes onto the carriers. The stacks of baskets with the other products are moved from the carriers into other storage locations. The storage locations are identified with the other products. The method steps are repeated inputting loaded baskets with third and fourth products into the storage locations. Before, as or after trucks arrive at the loading docks, the loaded baskets are retrieved from the storage locations with the carriers according to the orders for loading the products on the trucks. The loaded baskets are moved from the carriers onto robotic and conveyor output lanes. The baskets are moved from the conveyor and robotic output lanes to output transfer conveyors. Tagging stations tag and/or read destinations on the loaded baskets. The loaded baskets are moved from the output transfer conveyors to an output conveyor. The loaded baskets are moved from the output conveyor to loaders or conveyor loops. The loaded baskets are loaded on dollies or moved on the conveyor loops for loading the loaded baskets into the trucks.

These and further and other objects and features of the invention and apparent in the disclosure, which includes the above and ongoing written specification, with the claims and the drawings.

DETAILED DESCRIPTION OF THE PREFERRED EMBODIMENTS

Figure 1:
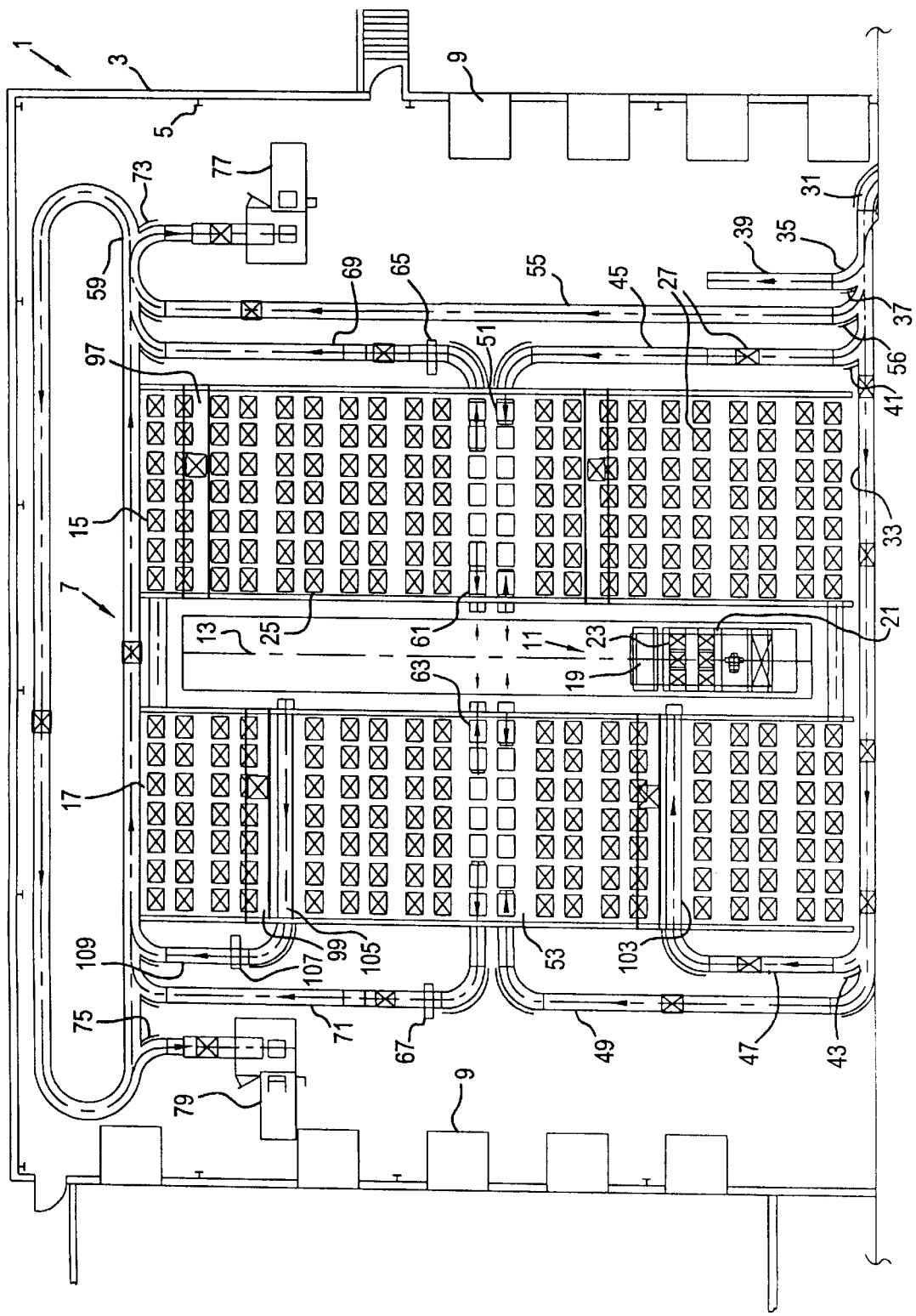
FIG. 1 is a plan view of an interim storage and retrieval system for long production runs of bakery products and rapid retrieval for loading trucks.

Referring to FIG. 1, an interim storage facility is generally indicated by the numeral 1. The storage facility has a building 3 generally constructed with steel frames 5. A rack system generally indicated by the numeral 7 is installed in a building. In a preferred embodiment, the rack system supports the center of the building which is sufficiently tall to provide the rack system. The sides of the building may have lower roofs to cover the conveyors and loaders. Docks 9 allow trucks or trailers to deliver loads for input and to receive their loads for delivery.

At the heart of the storage system is a stacker retriever 11 which moves horizontally along aisle 13 between racks 15 and 17. The stacker retriever has vertical members 19 along which a carriage 21 moves. Carriers 23 move into and out of the racks 15 and 17 when the carriage is aligned with particular storage locations 25 within the rack.

Figure 2:
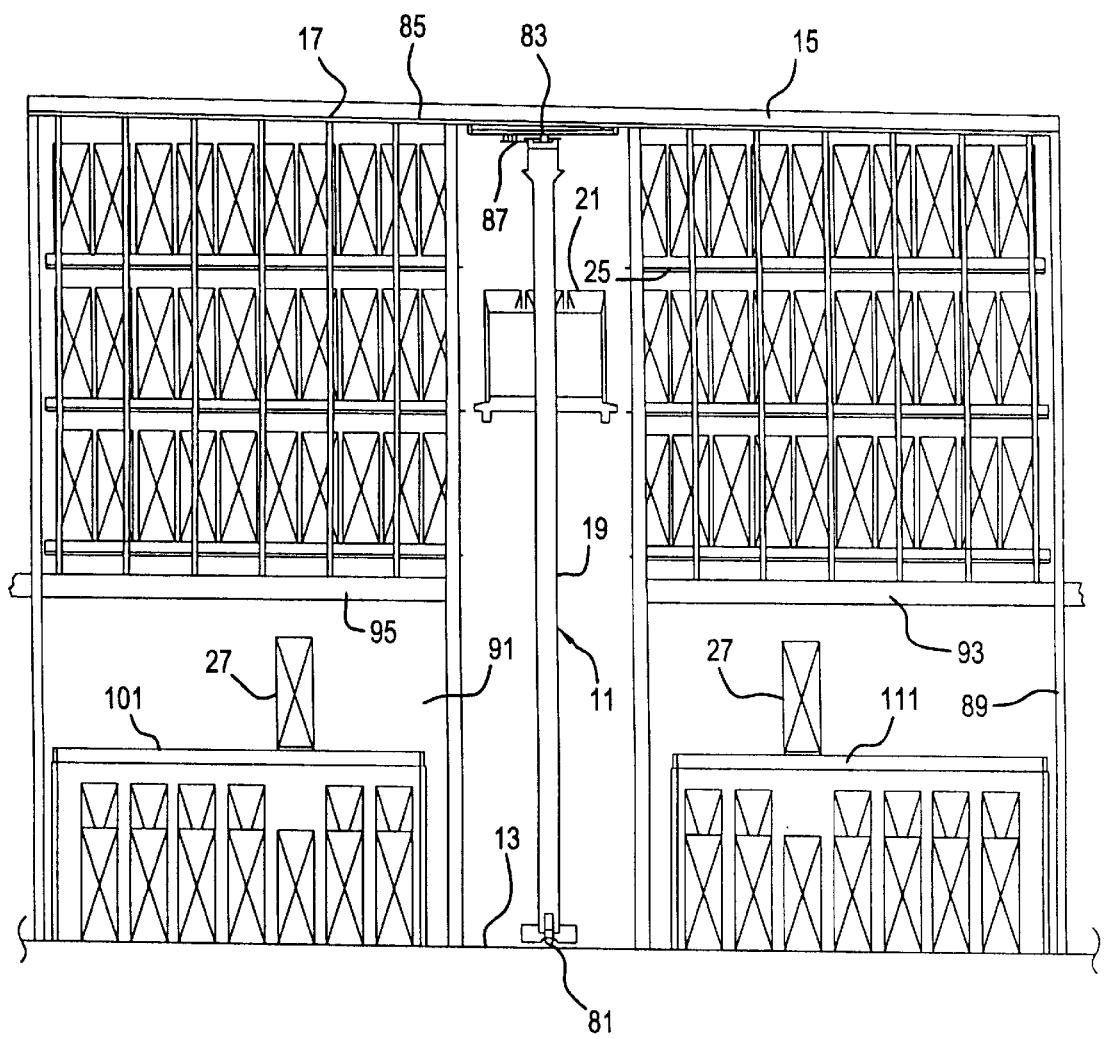
FIG. 2 is an elevational view of the storage system shown in FIG. 1.

As shown in an example in FIGS. 1 and 2, there are two carriers 23 on the carriage 21. Each carriage may carry up to three loaded basket stacks, and each storage location may hold up to ten loaded basket stacks 27, as shown in the example. The carriers 23 are capable of entering all of the way into the storage locations 25 to deposit and pick up loaded baskets from the deepest points in the storage locations.

In a preferred embodiment of the invention, baskets are loaded with products and identified according to the product contained in the basket in a bakery which is connected to the input end 31 of an input conveyor 33. The loaded baskets pass an I.D. reader station 35 which verifies that each loaded basket is labeled and is labeled correctly with an identification. For example, the I.D. station knows that each basket of one production run should be similarly identified. If a basket is improperly identified or if identification is missing, the reader 35 causes gate 37 to deflect the loaded basket onto reject conveyor 39. According to the particular production run and identification readers at the gates, switchable gate 41 or gate 43 may direct loaded basket stacks 27 onto an input transfer conveyor 45 or an input transfer conveyor 47. Loaded products which pass gates 41 and 43 on input conveyor 33 flow onto input transfer conveyor 49.

From the input transfer conveyors the loaded baskets are placed in robotic input lanes 51 and 53 and conveyor input lane 103. From the input lanes, baskets are picked up by carriers 23 when the carriers are aligned with input lanes. Readers on the stacker retriever read the basket identifications and take identified loaded baskets and basket stacks to predetermined storage locations 25 within the rack system on either side of the aisle 13.

As one product run is finished, another product run begins and the products move on the input conveyors and input transfer conveyors to the input lanes and from there to the particular storage locations 25. Robotics preferably engage the baskets and move the baskets on the robotic lanes.

Multiple products are stored in the storage racks according to production runs.

When it is necessary to directly load trucks with products from the bakery, products may move from the input 31 and input conveyor 33 directly onto bypass transfer conveyor 55 according to the position of gate 56. From the bypass transfer conveyor 55 the products move directly to the output conveyor 59.

At the same time, the stacker retriever moves to align the carriage 21 and carriers 23 with particular storage locations 25 and sends the carriers into the storage locations to pick up stacks of loaded baskets and to withdraw the loaded baskets from the storage locations 25 to carriage 21. The stacker retriever then moves the loaded carriage 21 to the robotic output lanes 61 and 63 and conveyor output lane 105. Conveyors at those locations move baskets past output tag stations 65, 67 and 107 where the baskets are read and/or tagged with a further identification of destination. Each output tag station has a reader to verify the contents of the loaded baskets.

The loaded baskets move on the output transfer conveyors 69, 71 and 109 to the output conveyor 59. The loaded baskets move on the output conveyor 59 until a gate 73 or 75 is positioned to move the loaded baskets onto dolly loader stations 77 and 79 or conveyor loops. The gates 73 and 75 have readers which read the output destination tags placed on the baskets at tag stations 65, 67 and 107. At the dolly loader station, for example, two loaded basket stacks are placed on dollies or a conveyor loop, and are moved to the appropriate loading dock 9.

FIG. 2 shows the aisle 13 and the stacker retriever 11 which is mounted in the aisle between the racks 15 and 17. The carriage 21 moves up and down vertical members 19 according to directions from a computer control. The stacker retriever moves on a rail 81 at the center of the aisle 13 and is guided at the top by a rail 83. Top rail 83 is supported by the cross member 85 which stabilizes the racks and supports the roof. A power rail 87 powers the horizontal and vertical drive motors for the vertical members 19 and carriage 21.

In FIG. 2, tunnels 89 and 91 are shown with robots 101 and 111 to move the loaded baskets 27. Beams 93 and 95 support the storage system.

Referring to FIG. 1, the robots 97 and 99 move within the open areas 89 and 91, to carry loaded baskets 27 from the robotic input lanes to positions for pick up by the stacker retriever carriers or directly to staging location in robotic lane and to carry loaded baskets which are deposited by the carriers or placed by robots in robotic lane on the robotic output lanes 61 and 63.

Also shown in FIG. 1 are conveyor input lane 103 and conveyor output lane 105. The conveyor input lane 103 is connected to auxiliary input transfer conveyor 47 to provide stacks of loaded baskets along the conveyor 103 to the inner end where the are picked up by carriers 23. Carriers 23 also deposit stacks of loaded baskets on the conveyor output lane 105, where the baskets are conveyed and are tagged or read at output tag station 107 and transferred on auxiliary transfer conveyor 109 to the output conveyor 59.

While the invention has been described with reference to specific embodiments, modifications and variations of the invention may be constructed without departing from the scope of the invention, which is defined in the following claims.

We claim:

1. Basket storage and retrieval apparatus for a bakery comprising spaced parallel rows of storage racks with multiple horizontal tiers, an aisle between the storage racks and guides connected to the aisle, a stacker retriever connected to the guides, the stacker retriever having at least one vertical member, a carriage mounted on the vertical member for moving up and down the vertical member and aligning with storage rack tiers on opposite sides of the aisle, at least one carrier mounted on the carriage for moving into the horizontal tiers and lowering baskets within the tiers for resting on the tiers and raising baskets from the tiers for moving the raised baskets toward the carriage, a robotic input lane extending through at least one of the storage racks and a robotic output lane extending through at least one of the storage racks, an input transfer conveyor connected to the robotic input lane and an output transfer conveyor connected to the robotic output lane, an input conveyor connected to the input transfer conveyor for supplying loaded baskets to the input transfer conveyor and an output conveyor connected to the output transfer conveyor for receiving loaded baskets from the output transfer conveyor and a dolly loader or conveyor loop connected to the output conveyor for loading on trucks.

2. The apparatus of claim 1, wherein the input and output transfer conveyors are on a side of the storage racks opposite the aisle.

3. The apparatus of claim 1, further comprising a second robotic input lane and a second robotic output lane extending through the second storage rack from the aisle to an outer side of the second storage rack, a second input transfer conveyor connected to the second robotic input lane and a second output transfer conveyor connected to the second robotic output lane and connected to the output conveyor for moving loaded baskets from the second robotic output lane to the output conveyor.

4. The apparatus of claim 3, wherein the output conveyor comprises a loop for receiving loaded baskets from the output transfer conveyors.

5. The apparatus of claim 4, further comprising a second dolly loader or conveyor loop connected to the output conveyor for receiving loaded baskets from the output conveyor and moving loaded baskets or basket stacks for loading in predetermined trucks.

6. The apparatus of claim 1, further comprising at least one conveyor input lane extending through at least one of the racks and at least one conveyor output lane extending through at least one of the racks and further comprising an input transfer conveyor connected to the conveyor input lane and to the input conveyor for moving stacks of loaded baskets to the conveyor input lane and an output transfer conveyor connected to the conveyor output lane and to the output conveyor for moving stacks of loaded baskets from the conveyor output lane to the output conveyor.

7. The apparatus of claim 6, further comprising an input inspection station for inspecting the loaded baskets and identification on the loaded baskets before admitting the loaded baskets to the input conveyor, a rejection conveyor connected to the input inspection station for moving rejected baskets from the input inspection station.

8. The apparatus of claim 7, further comprising output tagging and/or reading stations connected to the output transfer conveyors for tagging and/or reading loaded baskets leaving the output lanes before moving the loaded baskets to the output conveyor.

9. The apparatus of claim 1, wherein the stacker retriever further comprises two spaced vertical member, wherein the carriage rides up and down on the two spaced vertical members, and wherein the carrier further comprises at least two parallel carriers for entering the rack and depositing baskets deeply within the rack and retrieving baskets from deeply within the rack.

10. The apparatus of claim 9, further comprising a bypass transfer conveyor connected between the input conveyor and the output conveyor for transferring loaded baskets directly from the input conveyor to the output conveyor.

11. The apparatus of claim 10, further comprising switches connected between the input conveyor and the reject conveyor, the input conveyor and the bypass transfer conveyor, and the input conveyor and the input transfer conveyors, for selectively switching loaded baskets according to identifications on the loaded baskets.

12. The apparatus of claim 11, further comprising switches connected to the first and second loaders and destination tag readers connected to the switches for off-loading selected loaded baskets from the output conveyor to the loaders or a conveyor loop.

13. Apparatus for temporarily storing surges of product and retrieving the product comprising an input conveyor connected to a source of product-loaded baskets, an identification station connected to the input conveyor for checking identification of the loaded baskets, a rejection conveyor connected to the identification station for receiving loaded baskets with no or improper identification, a storage rack having multiple rows of storage arranged in multiple tiers, multiple storage locations roughly equivalent to a number of tiers times a number of rows, each of the storage locations having an elongation capable of receiving and storing multiple loaded baskets or stacks of loaded baskets, an aisle adjacent the storage rack, each of the storage locations opening into the aisle for access from the aisle, a stacker retriever mounted in the aisle and having at least one vertical member for moving horizontally along the aisle in front of the openings of the storage locations, a carriage movable up and down the at least one vertical member for aligning with the storage locations and at least one carrier mounted on the carriage for moving from the carriage into the storage locations for depositing loaded baskets into the storage locations and for retrieving loaded baskets from the storage locations, at least one robotic input lane connected to the rack, an input transfer conveyor connected between the input conveyor and the robotic input lane, at least one robotic output lane connected to the rack, an output transfer conveyor connected between the output conveyor and a robotic output lane, an output tag station connected to the output transfer conveyor for tagging and/or reading loaded baskets moving onto the output transfer conveyor, an output conveyor connected to the output transfer conveyor and a loading output connected to the output conveyor for moving the loaded baskets away from the storage apparatus.

14. The apparatus of claim 13, further comprising a second rack spaced from the first rack and positioned adjacent the aisle with openings in storage locations opening into the aisle for receiving the carriers with loaded baskets in the second storage locations in the second rack and for receiving the carrier to remove loaded baskets or stacks from the second storage locations, second robotic input and output lanes connected to the second rack for transferring loaded baskets or stacks into and out of the racks, a second input transfer conveyor connected to the robotic input lane and to the input conveyor for transferring loaded baskets or stacks from the input conveyor to the second robotic input lane and a second robotic output transfer conveyor connected to the second robotic output lane and to the output conveyor for transferring loaded baskets or stacks from the second robotic output lane to the output conveyor.

15. The apparatus of claim 14, wherein the robotic lanes comprise a first robotic input lane and a first robotic output lane in the first storage rack and a second robotic input lane and a second robotic output lane in the second storage rack.

16. The apparatus of claim 15, further comprising a second output tag station connected to the second output transfer conveyor for tagging and/or reading a destination of the loaded baskets.

17. The apparatus of claim 16, further comprising a second loader connected to the output conveyor for receiving loaded baskets and moving loaded baskets away from the output conveyor.

18. A method of storing and retrieving production run product surges comprising loading baskets with product, identifying the baskets according to product within the baskets, checking identification of the baskets and rejecting baskets without identification, moving the baskets on an input conveyor and moving the baskets from the input conveyor to an input transfer conveyor and moving the baskets from the input transfer conveyor to a robotic input lane, moving the baskets from a robotic input lane to carriers on a stacker retriever carriage, moving the carriage to a predetermined storage location, loading baskets with other products and identifying the baskets according to the other products, moving the identified baskets with the other product on the input conveyor, moving the loaded baskets with the other products on the input transfer conveyor to the robotic input lane and moving the baskets with the other products from the robotic input lane onto the carriers and moving the product from the carriers into other predetermined storage locations, repeating the method steps for inputting loaded baskets with third and fourth products into the storage locations, retrieving loaded baskets from storage locations with the carriers according to orders for loading products on trucks, moving the loaded baskets from the carriers onto a robotic output lane, moving the baskets from a robotic output lane to an output transfer conveyor, tagging and/or reading destinations on the loaded baskets, moving the loaded baskets from the output transfer conveyor to an output conveyor and moving the loaded baskets from the output conveyor to dollies or conveyor loops for loading the loaded baskets or stacks onto trucks.

19. The method of claim 18, further comprising moving the loaded baskets on the input transfer conveyor to a conveyor input lane and moving the loaded baskets onto the carriers and moving the loaded baskets from the carriers onto a conveyor output lane and from the conveyor output lane to an output transfer conveyor.

* * * * *